C. M. LEONARD.
PRUNING SAW.
APPLICATION FILED DEC. 4, 1911.
1,028,230.
Patented June 4, 1912.
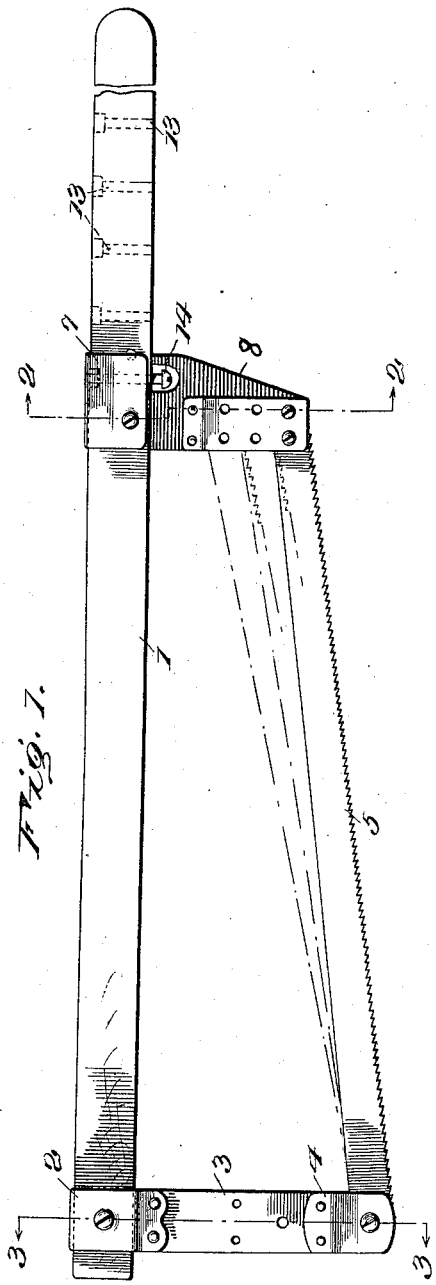
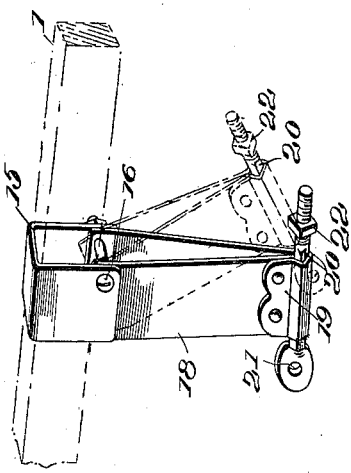
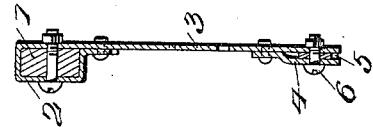
Witnesses
H. E. Coleman,
L. H. Ellis.
Inventor
Charles M. Leonard.
By Watson E. Coleman,
Attorney

UNITED STATES PATENT OFFICE.

CHARLES M. LEONARD, OF HILTON, NEW YORK.

PRUNING-SAW.

1,028,230.

Specification of Letters Patent.

Patented June 4, 1912.

Application filed December 4, 1911. Serial No. 663,734.

*To all whom it may concern:*

Be it known that I, CHARLES M. LEONARD, a citizen of the United States, residing at Hilton, in the county of Monroe and State of New York, have invented certain new and useful Improvements in Pruning-Saws, of which the following is a specification, reference being had to the accompanying drawings.

My invention relates to new and useful improvements in pruning saws and has for its object to provide a saw of this character whereby any length of saw blade can be used and can be adjusted to various angles with relation to the handle.

Another object is to provide a pruning saw which will possess advantages in points of efficiency and durability, is inexpensive of manufacture and at the same time is simple in construction and operation.

With the above and other objects in view the invention consists in the novel features of construction and the combination and arrangement of parts hereinafter described, pointed out in the claims and shown in the accompanying drawings, in which, Figure 1 is a side elevation of my improved pruning saw; Fig. 2 is a sectional view on the line 2—2 of Fig. 1; Fig. 3 is a sectional view on the line 3—3 of Fig. 1; Fig. 4 is a perspective view of a modified form of means for adjustably securing one end of the saw blade.

Referring more particularly to the drawings, 1 indicates the handle having a sleeve 2 mounted upon the outer end thereof having a laterally extending arm 3 formed integral therewith and extending at right angles from the handle. A clamping plate 4 is riveted to the lower end of the arm 3 and the end of the saw 5 is disposed between said plate and the outer end of the arm and held securely in place by means of the small bolt 6. Secured to the handle 1 at the required distance from the end of the handle is a second sleeve 7 having a laterally extending arm 8 formed integral therewith and extending at right angles from the handle, said sleeve being cut away at its lower side. Secured to the arm 8 by means of the rivets 9 is the clamping plate 10, said plate and arm 8 are provided with a series of openings 11 arranged in pairs, and the free end of the saw blade is adjustably secured between said plate and arm by means of the small bolts 12 disposed in the openings 11. A number of openings 13 are arranged in the handle adapted to receive the bolt 14 which is disposed through the handle and abutting against the inner side of the top of the sleeve so that the sleeve and arm may be tilted upon the handle by turning the bolt 14, and the saw blade may be tightened or loosened as required.

In Fig. 4 I have shown a modified form of means for adjustably securing the free end of the saw blade. This form consists of a U-shaped member 15 slidably mounted on the handle and held in any required position by means of the clamping bolt 16. Pivotally secured to the member 15 is a V-shaped member 18 having a rectangular sleeve 19 formed integral with the lower end thereof, said member being adapted to be tilted as shown in dotted lines to tighten or loosen the saw and is held in position by the bolt 16, said bolt also forming a pivot for said member. A bolt 20 is disposed in the sleeve 19, having one end secured to the saw as shown at 21 and a nut 22 is threaded on the other end to securely tighten the saw blade.

It will be seen from the above that the saw blade can be quickly and easily removed at any time for sharpening or for replacing it by a new one and that any length of blade can be used and can also be adjusted to various angles with relation to the handle.

While I have shown and described the preferred form of my invention it will be obvious that various changes in the details of construction and in the proportions may be resorted to for successfully carrying my invention into practice without sacrificing any of the novel features or departing from the scope thereof.

Having thus described my invention, I claim:

1. A pruning device comprising a handle, a sleeve mounted on one end thereof, an arm formed integral with said sleeve and disposed at right angles to the handle, a saw blade having one end secured to the outer end of said arm, a second sleeve mounted on said handle a desired distance from the first mentioned sleeve, an arm formed integral therewith, a plate secured to said arm, said arm and plate being provided with a series of openings arranged in pairs and bolts passing through said openings and through the free end of the saw blade to adjustably connect the saw blade to the handle.

2. A pruning device comprising a handle, an arm secured to one end and disposed at right angles thereto, a saw blade having one end secured to the outer end of said arm, a sleeve mounted on said handle a desired distance from the arm, an arm formed integral with said sleeves, means for adjustably connecting the free end of the saw blade to the second mentioned arm, said handle having a plurality of spaced openings formed therein, a bolt adapted to be disposed in said openings and abut against the inner side of the top of said sleeve, the turning movement of said bolt being adapted to tilt said sleeve to tighten or loosen the saw blade as required.

3. A pruning device comprising a handle, an arm secured to one end and disposed at right angles thereto, a saw blade having one end secured to the outer end of said arm, a U-shaped member slidably mounted on said handle a desired distance from the arm, a bolt disposed through the ends of said member and adapted to clamp the same to the handle, a V-shaped member pivotally secured to said U-shaped member by said bolt, the free end of said saw blade being adjustably secured to the lower end of said V-shaped member, said V-shaped member being adapted to be disposed at various angles to tighten or loosen the saw blade, the clamping action of said bolt holding said member in adjusted position.

In testimony whereof I hereunto affix my signature in the presence of two witnesses.

CHARLES M. LEONARD.

Witnesses:
M. A. LEONARD,
ANTHONY COLE.

---

Copies of this patent may be obtained for five cents each, by addressing the "Commissioner of Patents, Washington, D. C."